United States Patent [19]
Kim

[11] Patent Number: 4,665,536
[45] Date of Patent: May 12, 1987

[54] PROGRAMMABLE AUTOMATIC POWER-OFF SYSTEM FOR A DIGITAL TERMINAL

[75] Inventor: Dongsung R. Kim, Laguna Hills, Calif.

[73] Assignee: Burroughs Corporation, Detroit, Mich.

[21] Appl. No.: 837,991

[22] Filed: Mar. 10, 1986

[51] Int. Cl.[4] ............... G06F 15/02; G06M 3/02
[52] U.S. Cl. .............................. 377/16; 235/377; 364/707
[58] Field of Search ............... 377/16; 235/377; 364/707

[56] References Cited

U.S. PATENT DOCUMENTS

| | | | |
|---|---|---|---|
| 3,941,989 | 3/1976 | McLaughlin et al. | 364/707 |
| 3,955,185 | 5/1976 | Nishimura | 364/707 |
| 4,049,952 | 9/1977 | Forsslund | 377/16 |
| 4,381,552 | 4/1983 | Nocilini et al. | 364/900 |
| 4,409,665 | 10/1983 | Tubbs | 364/707 |
| 4,419,917 | 12/1983 | Sato | 364/707 |
| 4,463,646 | 8/1984 | Mitarai | 364/707 |

*Primary Examiner*—John S. Heyman
*Attorney, Agent, or Firm*—Alfred W. Kozak; Nathan Cass; Kevin R. Peterson

[57] ABSTRACT

A programmable unit for attachment to a work-station whereby power to the work-station will be shut off after a pre-set time-period, unless work-station activity occurs before the outset of the time-period, when the pre-set time-period will initiate again.

14 Claims, 2 Drawing Figures

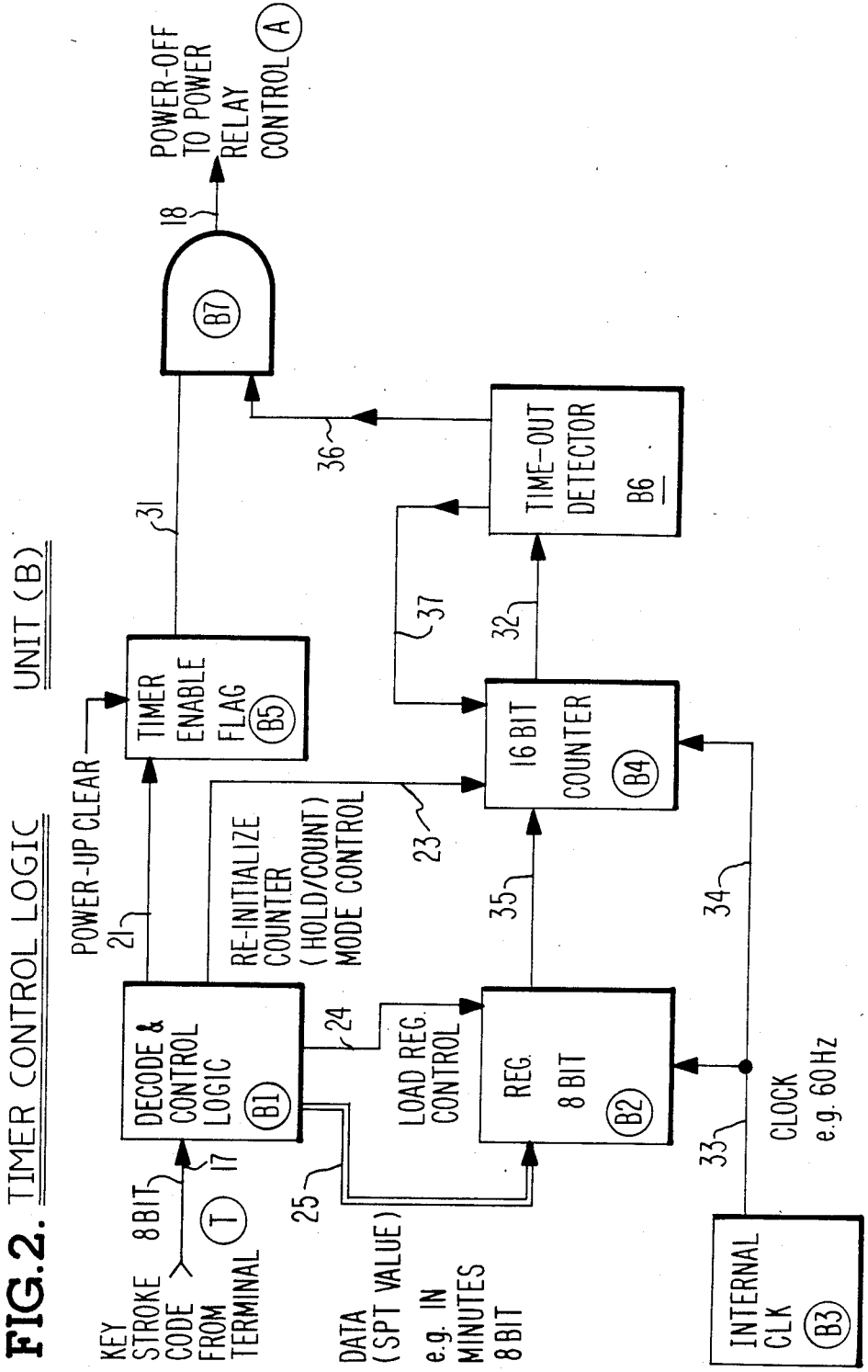

PROGRAMMABLE AUTOMATIC POWER-OFF SYSTEM FOR A DIGITAL TERMINAL

FIELD OF THE INVENTION

This disclosure relates to the timed control of power involving terminals and work stations in an individual terminal work station or a network of terminal work stations.

BACKGROUND OF THE INVENTION

Due to present concern for conservation of power usage, many areas of technology have conceived and developed methods for conserving electrical power usage.

One of the commonly occurring situations which involves waste and unnecessary use of power is the situation wherein offices where engineering groups, realtors' offices, brokerage offices, clerical offices, etc., using digital equipment, may use their work station terminals for very long periods of time or, due to other duties and requirements, make only intermittent use of the work station or receiving units in a network.

To this end, it has often been office policy or plant policy that equipment be turned off when not in use or overnight when the office or plant is closed.

Quite occasionally, however, the operators of terminal equipment may not want to turn off the power in their terminals when being interrupted or having to leave for short periods, after which they intend to return. However, sometimes the unavoidable absences extend to longer periods of time and there is no chance or occasion to return and shut off the terminal equipment.

Thus it is conceivable that consideration should be given to automatic methods of power turn-off for work station and other terminals.

This could involve considerable savings since many plants and offices use not only two or three work station terminals but sometimes these number in the hundreds of work station terminals.

SUMMMARY OF THE INVENTION

In order to eliminate the need for worrying as to whether or not a system or a set of work stations or a single terminal have been used with attention to the most economical power savings, the present disclosure involves an automatic timing and power turn-off system which may be provided within each work station terminal or which may be supplied as a separate and discrete modular unit which is attachable to a work station terminal.

In the presently described system there is provided a timer control logic unit whereby a coded key-stroke code can be used to set a desired time-out into the unit so that, if no keyboard or data transmission activity has occurred within that period of time-out, then the logic unit will activate a power control relay to shut-off power to the work station terminal.

The programmatic feature provides a flexibility and user-control to determine what period of inactivity should be used to constitute the time-out period for developing a power-off situation. It permits the flexibility for leaving the terminal on for long periods of time if desired.

The present system contemplates that if, during the running of the time-out period, there is any key-stroke activity or data messages to the work station terminal, then the previous time-out period will be canceled and a new time-out period will be started. Further, the present system permits for an immediate "turn-on" of power, either by a manual override button on the power control relay or by means of a mere touch of the keystroke button of a terminal work station.

The present configuration involves the use of a power control relay which can switch power off/on to the terminal work station and whereby the power control relay is regulated by a timer control logic unit. Thus, by keying the keyboard on the work station, there is developed a key-stroke code which can be conveyed to the timer control logic unit to establish the running of the time-out period and also for the cancellation and re-initialization of the time-out period should there be any activity whatsoever in the form of key-strokes on the work station or data being transferred from another terminal into the local work station terminal.

BRIEF DESCRIPTION OF THE DRAWINGS

FIG. 2 is a block diagram of the timer control logic unit which is used to control the operating status of the power control relay.

DESCRIPTION OF PREFERRED EMBODIMENT

Figure 1:
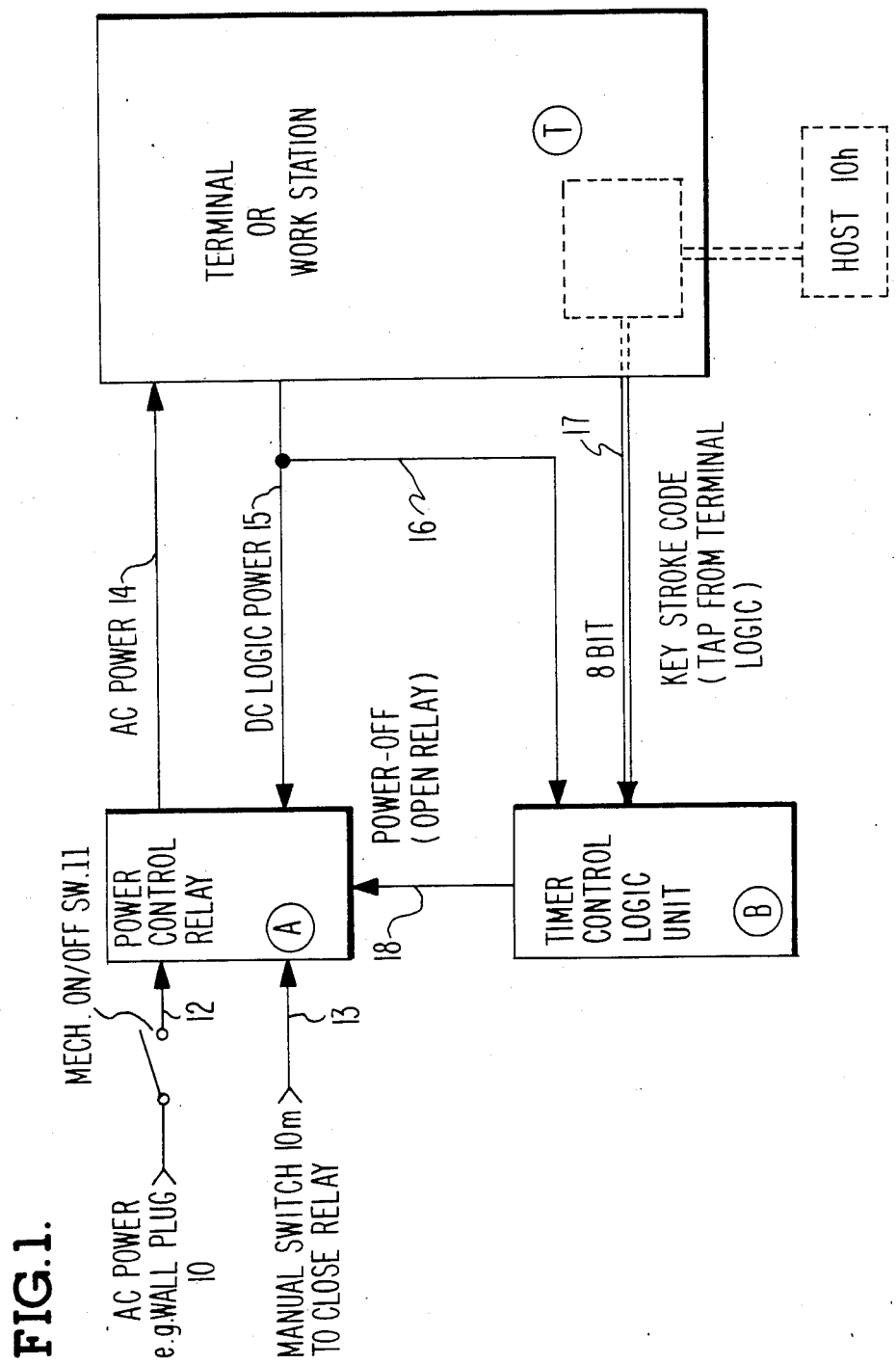
FIG. 1 is a diagram of the work station having its basic power supply controlled by a power control relay which, in turn, is controlled by a timer control logic unit.

FIG. 1 shows a power control relay A which conveys alternating current power to a terminal or work station T. The power control relay A has one input from the AC power source 10 via a mechanical on/off switch 11. The other input to the power control relay A is a manual overrride switch 10m which is used to close the relay in A so as to apply power to the terminal T.

The terminal T provides DC logic power on line 15 to the power control relay A and also, on line 16, to another unit designated as the timer control logic unit B.

An output line 18 from the timer control logic unit B connects to the power control relay A for purposes of turning the power off by opening up the relay in the relay control A. The lines 14 convey AC power to the terminal T.

The power control relay A and the timer control logic unit B could be placed and mounted in an external box and constitute an independent unit which could be attached to the system. On the other hand, this combination of control relay A and timer logic unit B could all be built into the terminal or work station T.

The DC logic power shown on line 15 of FIG. 1 could be provided internally within the work station or it could be generated within the control relay A and timer logic unit B.

Alternatively, the DC logic power for the timer control logic unit B could be placed at the AC power source 10 so that the timer control unit is always energized as long as the AC power is supplied at 10.

Another possibility for power to the timer control logic unit B is that it be provided with its own internal battery unit to provide the DC logic power which would replace the power coming on line 16 from terminal T.

As seen in FIG. 1, there is another output bus 17 which exits from the terminal T and which provides an eight bit code entitled "Key Stroke Code". This Key Stroke Code is useful to set the time-out period function and will be described in connection with FIG. 2.

The power control relay A has a normally closed relay switch which can be opened or interrupted when the "power-off" signal on line 18 is received from the timer control logic unit B. This will cause the relay in the control relay A to open and to stop the AC power on line 14 to terminal T.

The power control relay A closes the relay when the manual override switch 10$_m$ is activated. It is needed to "turn-on" the power after the unit has been "powered off" via the automatic timer control logic unit B.

However, if the time-out period has not yet run, then any time there is any key-stroke activity in the terminal T where the terminal T is receiving a message, then the timer control logic unit B will cause the power control relay A to be reset and to re-initialize the timer control logic B so that a new time-out period is now started and the old one has been effectively canceled.

As seen in FIG. 1, the DC logic power outputs from terminal T over to the power control relay A on line 15. Another line 16 branches off the DC logic power over to the timer control logic unit B. The power conveyed on line 16 functions to convey DC power from the terminal T over to the timer control logic unit B.

In FIG. 1, an eight-bit coded signal is conveyed on bus 17 over to the timer control logic unit B. This signal is manually keyed-in by the operator of the terminal T to represent a settable time-period "P" which will permit a "power-on" condition to continue until the time period P has run out, after which the timer logic unit B will "shut-off" the power via the control relay A.

It should be noted here that the time period P can only run to its full termination as long as there has not been any activity on bus 17; that is to say, there have been no data transmissions involving the terminal T for the time period P.

The time-out period P may be looked at as the "maximum pre-set" time period between key-stroke activity. Thus, if any key-stroke activity activates signals on bus 17, the previous time-out period P is canceled and a new time-out period is started so that there is no need for manual resetting or concern as to how the new time period will be set.

The eight-bit bus 17 may be looked upon as a "key-stroke bus" and is a tap signal that constitutes a communication line between the keyboard of the terminal and the terminal T itself. This communication line could be expanded and tapped to form a communication line between the terminal T and the main host system in order to detect any receive/send activity between the terminal and the host system. Thus, any such receive/send activity between the terminal and the host system will, in effect, cancel the last pre-set time period P and will re-initialize and restart the running of the time-out period.

Referring to FIG. 2, there are shown the elements of the timer control logic unit B. An internal clock B3 feeds its clock output on line 33 to an eight-bit register B2 and also to a 16-bit counter B4 on line 34.

The decoder-control logic B1 receives the key-stroke code from the terminal T and decodes it in the following fashion. If the code is the predetermined code which would set up the program value of P, then it will put the register B2 and the counter B4 into the "load mode" via lines 24 and 23, respectively. Then it will take the next key-stroke code as the value P which may, for example, be the number of minutes, and load this code into the eight-bit register B2. On the next clock, this value will be transferred to the upper eight bits of the 16-bit counter B4. At the same time, the decoder-control logic B1 will put the eight-bit register B2 into the "hold mode" via the control line 24. Then the decoder controller logic B1 will put the counter B4 into the "countdown mode" via the control line 23.

Finally, the decoder-control logic B2 will set the timer enable flag B5 (flip-flop) via line 21, thus enabling the power control logic to AND gate B7.

If the key-stroke code is any other code (non-setup code), then the decode-control logic B1 will put the 16-bit counter B4 into the "load mode" via the control line 23 in order to reload the contents on the eight-bit register (B2) value into the upper eight bits of the 16-bit counter B4. Then the decoder-control logic B1 will put back the counter B4 over into the "count down" mode again via the control line 23.

Optionally, another predetermined key code could be defined for the "disable" function. In this case, the decoder-control logic B1 would detect this code and simply reset the timer enable flag flip-flop B5 via the control line 21.

As the "power-up clear" signal (when starting the system) can be generated by the DC power supply of the terminal T, by the power control relay A, or internally by the timer control logic unit B, then this signal will reset the timer enable flag flip-flop B5 in order that it does not have a false "power-off" signal during initialization.

The "power-up clear" signal also initializes the decoder-control logic B1. This includes presetting the registers B2 and counter B4 with a "default value", which is a predetermined value in some available programmable storage.

In the simplest default case, the "default" would do nothing, which means that the entire "power-off" feature is disabled, which is already done by the resetting of the timer enable flag flip-flop B5.

The internal clock B3 provides clock signals to register B2 and counter B4. The clock period can be determined by defining the "key-byte" value.

A simple example is the case where the key-stroke code of eight bits is the binary equivalent of "minutes", then the clock period must be 256/60 Hertz.

However, this could be done many different ways. The decoder-control logic B1 could convert this by mapping the key-stroke code to another value before loading the eight-bit register B2. Also, the 16-bit counter B4 could be expanded for different clock resolution.

The 16-bit counter B4 value will feed the time-out detector B6 of FIG. 2, which then detects all "0" conditions as a "time-out" situation.

Then the time-out detector B6 will put the 16-bit counter B4 into the "hold mode" via the control line 37, thus stop the counter from counting down. Further, the time-out signal 37 feeds the AND gate B7. In actual operation, the lines 36 and 37 could be operated as the same output line from time-out detector B6.

In FIG. 2, the line 31 from the timer enable flag flip flop B5 would be set to its "true" value by the decoder-control logic B1 during the earlier phase of operation. Now, when the time-out line 36 becomes "true" by the time-out detector B6, then the output of the AND gate B7 becomes "true" on line 18. This line is designated as the "power-off" line, which is connected to the power control relay A in order to open up the relay and to turn off the power to the terminal T.

There has herein been described a power control system for conserving energy in the usage of work stations and terminals in small or large digital networks. The benefits of the present system provide for automatic turn-off of power to any one or more terminals connected to a communication line when that particular terminal has been left unattended or unused, whether in the transmit or in the receive mode. However, should any activity occur before the time-out period has run out, then the system will be reset to cancel out the old running time period and to re-initialize and re-establish a new running time period before the power turn-off cycle will have shut off the power to the unit or other connected terminals in the system.

While a specific embodiment has been described which accomplishes the above mentioned features, it should be understood that other variations of the applicable concept may be effectuated but would still fall within the scope of the appended claims hereinafter.

What is claimed is:

1. An apparatus for effectuating power turn-off to a work station terminal after a programmatically preset time period, comprising in combination:
   (a) means for receiving coded timing data from said terminal and providing data and control signals to a timing means;
   (b) said timing means for clocking off said coded timing data and generating a time-out signal when the time period represented by said coded timing data has run out;
   (c) power control means for controlling the supply of power to said terminal, said power controlling means including:
      (c1) means to turn off power to said terminal upon receiving said time-out signal.

2. The apparatus of claim 1 wherein said means for receiving includes:
   (a) decoding means for translating output data from said terminal into a coded time parameter;
   (b) control logic means for generating control signals for said timing means;
   (c) said coded time parameter being operator-generated from said work station terminal.

3. The apparatus of claim 2 wherein said timing means includes:
   (a) internal clock means for generating clock signals for measuring the passage of time; and clocking a register means and counter means;
   (b) said register means for holding said coded time parameter;
   (c) said counter means for counting clocks until the count indicates the time period set in said register means, and including:
      (c1) means to generate a time-out signal for transmittal to a gating means;
   (d) gating means for generating a power-off signal to said power control means.

4. The apparatus of claim 3 wherein said control logic means includes:
   (a) means to enable said counter means to count said clock signals from said internal clock means;
   (b) means to enable said register means to receive said coded time parameter.

5. The apparatus of claim 4 wherein said gating means includes:
   (a) means for enabling or disabling said time out signal to/from being transferred to said power control means.

6. The apparatus of claim 5 wherein said gating means includes:
   (a) an AND gate having first and second inputs, and including:
      (a1) a power-off output line to said power control means
      (a2) said first input for receiving an enable/disable signal from a timer enable flip-flop;
      (a3) said second input for receiving said time-out signal; and
   (b) said timer enable flip-flop for temporarily disabling said gating means during start-up of power-on.

7. The apparatus of claim 5 which includes:
   (a) means to inhibit said gating means from generating a power-off signal during the initial turn on of power to the said terminal.

8. The apparatus of claim 7 wherein said means to inhibit includes:
   (a) a timer enable flag flip-flop, connected to said control logic means, and operating to prevent activation of said AND gate during initial turn-on of power to the said apparatus.

9. The apparatus of claim 7 wherein said power control means includes:
   (a) manual activation means for controlling the on-off condition of power to said terminal and to said power turn-off apparatus.

10. The apparatus of claim 9 which includes:
    (a) means to cancel-out a set time-out period which has been running.

11. The apparatus of claim 9 which includes:
    (a) means to sense any sending/receiving activity by said terminal;
    (b) means, responsive to said sensing means, for re-initiating a new time-out period.

12. An apparatus for automatic power turn-off of a work station terminal comprising:
    (a) a digital terminal having keyboard means for transmitting instructions and data to said apparatus;
    (b) register means, responsive to said keyboard means, for setting a coded number representing a selected time period;
    (c) counter means, connected to said register means, for providing a time-out signal to a gating means;
    (d) power control relay means connected to supply power to said digital terminal and connected to receive a control signal from said gating means;
    (e) control logic means for controlling said register means and said counter means;
    (f) gating means for providing a power-off signal to said power control relay means, said gating means including:
       (f1) inhibiting signal input means to prevent said power-off signal from activation.

13. The apparatus of claim 12 which includes:
    (a) flag flip-flop means, responsive to said control logic means to temporarily inhibit said gating means during initial power turn-on.

14. The apparatus of claim 12 wherein said power control relay means includes:
    (a) manual operating means for manual control of the power on/power off condition to said work station terminal and said apparatus.

* * * * *